(12) United States Patent
Pleiss

(10) Patent No.: US 6,676,324 B1
(45) Date of Patent: Jan. 13, 2004

(54) DEVICE FOR FIXING INTERIOR COVERINGS IN MOTOR VEHICLES

(75) Inventor: Eberhard Pleiss, Untersiemau (DE)

(73) Assignee: Brose Fahrzeugteile GmbH & Co. KG, Coburg (DE)

( * ) Notice: Subject to any disclaimer, the term of this patent is extended or adjusted under 35 U.S.C. 154(b) by 0 days.

(21) Appl. No.: 09/647,900
(22) PCT Filed: Mar. 30, 1999
(86) PCT No.: PCT/DE99/01023
§ 371 (c)(1),
(2), (4) Date: Oct. 6, 2000
(87) PCT Pub. No.: WO99/51461
PCT Pub. Date: Oct. 14, 1999

(30) Foreign Application Priority Data

Apr. 6, 1998 (DE) .......................... 198 16 533

(51) Int. Cl.[7] .................................. B60J 5/04
(52) U.S. Cl. .................. 403/33; 403/19; 411/549; 49/501; 24/581.11; 296/146.7
(58) Field of Search .................... 411/349, 45, 549; 403/282, 33, 19, 18, 26; 49/501, 502; 24/683, 607, 608, 581.11, 458, 486, 292, 297; 296/146.5, 146.7

(56) References Cited

U.S. PATENT DOCUMENTS

| | | | | |
|---|---|---|---|---|
| 2,658,790 A | * | 11/1953 | Fish et al. ................... 49/502 |
| 3,272,061 A | * | 9/1966 | Seckerson ................... 411/349 |
| 3,918,130 A | | 11/1975 | Poe |
| 5,048,234 A | * | 9/1991 | Lau et al. ..................... 40/502 |
| 5,102,163 A | * | 4/1992 | Ishikawa ..................... 296/146 |
| 5,351,443 A | * | 10/1994 | Kimura et al. ................ 49/502 |
| 5,419,606 A | | 5/1995 | Hull et al. |
| 5,669,108 A | * | 9/1997 | Ferrari et al. ................ 411/349 |
| 5,867,942 A | * | 2/1999 | Kowalski ..................... 49/502 |
| 6,132,154 A | * | 10/2000 | Easter ........................ 411/508 |
| 6,381,906 B1 | * | 5/2002 | Pacella et al. ................ 49/502 |

FOREIGN PATENT DOCUMENTS

| | | |
|---|---|---|
| DE | 1 964 030 | 7/1967 |
| DE | 25 02 663 | 7/1975 |
| DE | 33 03 254 | 8/1984 |
| DE | 33 33 092 | 3/1985 |
| DE | 34 24 075 | 1/1986 |
| DE | 35 17 121 | 7/1986 |
| DE | 44 38 309 | 6/1995 |
| DE | 195 29 883 | 6/1996 |
| EP | 0 747 604 | 12/1996 |

* cited by examiner

*Primary Examiner*—Lynne H. Browne
*Assistant Examiner*—Kenn Thompson
(74) *Attorney, Agent, or Firm*—Christie, Parker & Hale, LLP

(57) ABSTRACT

A device for fixing an interior covering in vehicles, more particularly for motor vehicle doors. An integrated adapter is provided in the interior covering through which a fastener can be operated for fixing the interior covering and/or a component part fixed on the interior covering to the bodywork part.

21 Claims, 5 Drawing Sheets

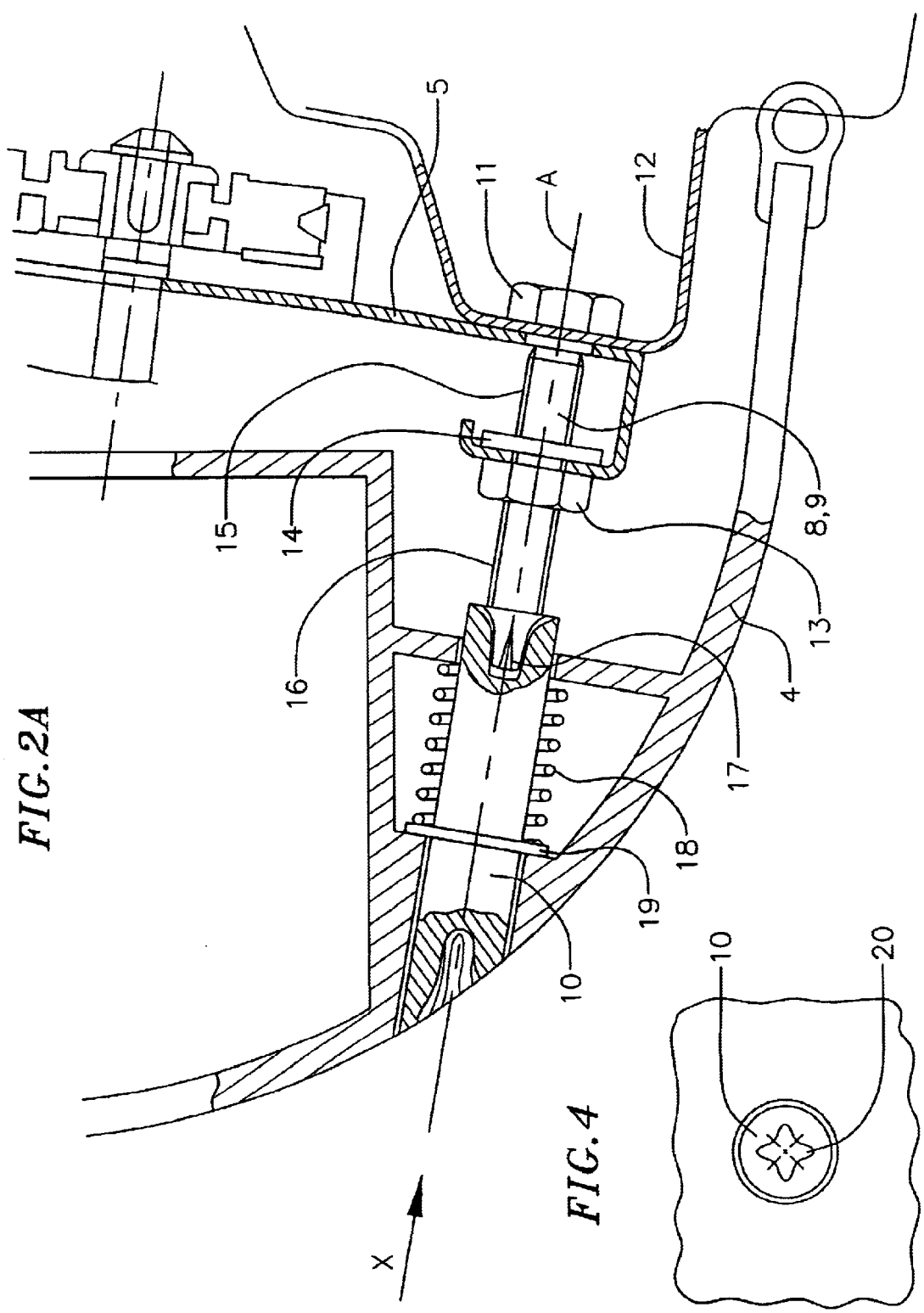

DEVICE FOR FIXING INTERIOR COVERINGS IN MOTOR VEHICLES

CROSS-REFERENCE TO RELATED APPLICATION

The present application claims priority to International application number PCT/DE99/01023, filed Mar. 30, 1999, which in turn claims priorty to German patent application number 198 16 533.1, filed on Apr. 6, 1998, hereby incorporated by reference in their entireties.

FIELD OF THE INVENTION

The invention relates to a device for fixing interior coverings in motor vehicles.

BACKGROUND OF THE INVENTION

It is known to an increasing extent to construct motor vehicle doors in modular fashion. In the modules which have become customary up until now, three structural groups have been assembled, namely the door outside panel, the sheet metal support plate and the door interior covering. The door outside panel thereby forms the closure for the bodywork and holds on the door interior covering the sheet metal support plate which serves inter alia to fix the closing devices, speaker systems, window lift drive mechanisms etc. The door interior covering has, as a rule, an arm rest, speaker openings and storage pockets and is fitted as one part closing the inner trim.

Through the separate parts described, during final assembly the three structural groups which have been pre-assembled and supplied as such are brought together in succession, which requires two assembly operations. In order to connect the interior covering to the other structural groups, it is necessary to use different variations of screws and clips. By way of example, it is necessary to undertake screwing from inside the door whereby the screw head is covered with a separate cap to reduce the visual impairment. The drawback here is the additional work required, together with the associated additional costs, and the danger of losing the caps or forgetting to fit them.

Furthermore, there is the possibility of screwing through the door outside panel or through the door base plate. Here there is the danger that the door which has already been painted becomes scratched. Similarly, as a rule, a cover strip has to be provided which places restrictions on the freedom of design.

Since the ability to dismantle the structure is required, fixing by using retainer clips does not guarantee any secure fixing of the interior covering since the clips can only take up restricted axial forces.

From DE 44 38 309 A1 an adapter is known which is integrated secured against rotation in the door interior covering and through which a fastening clip with radially expanding fingers can be pushed through an opening in the bodywork by pressing onto the inside panel of the door. After passing through the opening the fingers spread out and fix the interior covering of the door against the bodywork. The fastening clip can only absorb restricted axial forces since the fingers which project through the opening are radially displaceable.

From DE 195 29 883 A1 a connecting element is known for a vehicle component part where a screw is turned into an expanding dowel shaft so that the expanding dowel shaft widens out and fixes the component part against a corresponding holder. The screw thereby has to be fully screwed into the expanding dowel shaft in order to produce a sufficiently solid connection of the component part which is to be connected with the holder. Similarly for dismantling, the screw has to be completely unscrewed out from the dowel shaft so that high assembly and dismantling costs and times are incurred.

SUMMARY OF THE INVENTION

The object of the present invention is therefore to produce a fixing device which ensures a cost-effective simple assembly of an interior covering or a component part fixed on the interior covering. Furthermore a solid fastening which is simple to dismantle is also to be ensured without detracting from the overall visual appearance.

By integrating an adapter into the interior covering, it is not necessary to fit any separate cover parts which could become lost or forgotten. Sealing the screw hole is thus possible without any extra measures. Furthermore, in this way it is easy to fix component parts such as window lifters or sheet metal support plates mounted on the interior covering so that these in turn are in a position to absorb higher forces.

Although there are different ways in which the adapter can act on the fixing means, rotation and displacement is normally the easiest. For this, it is favourable if the adapter is integrated rotationally movable and axially displaceable in the interior covering so as to guarantee a simple and easy operation.

In a further development of the invention, the fixing means are in active connection with the interior covering and form one functional unit. The fixing means is in one variation more advantageously connected directly to the interior covering so that a simple association with the adapter can be produced.

In one design of the invention, the fixing means are fixed on a support plate or window lifter connected to the interior covering so that when fixing the interior covering the fixing means need still only be operated according to its configuration, for example rotated or axially displaced.

In one advantageous design of the invention, the adapter is loaded by a spring element against the assembly direction whereby it is pressed in the direction of the interior covering. The adapter thereby always occupies one position which ensures a smooth closure from the interior covering to the interior. It is economical and expedient to design the spring element as a plastics part integrated into the interior covering.

More particularly, when a solely longitudinally displaceable adapter is mounted on a curved surface, a guide is advantageously provided in a slide guide or in a thread since in this way it is ensured that a smooth surface is formed on the interior covering when the adapter slides back as it is turned or brought back to its starting position. Apart from the visual aspects, a flush closure with the interior covering is also advantageous for reasons of safety since injury through protruding edges can be avoided.

A screw bolt has proved to be a cost-effective proven embodiment of the fixing means. By screwing, it is possible to achieve a fixed yet releasable connection. Similarly, the shape of the screw bolt head can be simply adapted to the relevant requirements. Through screwing it is possible to compensate without problem any possible inaccuracies in the production since a very fine adaption to the relevant conditions can be achieved by adjusting the screw-in length.

Preferably, an abutment is attached to the screw bolt, for example in the form of a shoulder, a collar or a welded-on disc, whereby the screw bolt need only be screwed in up to the abutment in order to fix the interior covering on the inside door panel.

When configuring the adapter, it is advantageous if the maximum displacement path of the adapter is greater than or equal to the screw-in length of the screw bolt so that it can be guaranteed that screwing in can be completed to the full extent and faulty fastening of the interior covering through premature loosening of the connection between adapter and screw bolt cannot occur.

In one variation of the invention, the interior covering is fixed on a bodywork part through at least one expanding snap-hook which has an integral locking bolt. The snap-hook thus forms a type of casing whose outer diameter corresponds in one assembly position to the opening in the door outside panel through which the snap-hook is passed for the purpose of fixing. By knocking in or turning the locking bolt into a locking position, the snap-hook widens out and thus fixes the interior covering secure.

Through the snap-hook, it is possible to achieve a secure fastening with which axial forces can also be taken up. The integral shaping reduces the number of parts and guarantees the correct alignment and positioning of the locking bolt.

Furthermore, a simple assembly and dismantling is possible without great effort and the snap hooks cannot break as opposed to the clips previously used.

Advantageously, the locking bolt is connected by its lower end to the interior covering through an ideal break point in the region of the insert opening so that through a once only application of force the locking bolt can be inserted into the snap hook and fixes the interior covering. It is thereby expedient if the lower end of the locking bolt is formed paddle-shaped; thus, the width B is greater than the thickness D of the paddle. On the one hand a large expanding action can be achieved and on the other by turning the locking bolt the expansion can be cancelled and the snap hook can be brought into the initial assembly position.

In order to ensure a secure retention of the position occupied by the locking bolt, a detent catch can be provided in the lower end of the hollow cavity in a locking or dismantling position of the locking bolt which makes assembly easier. For control purposes, it is advantageous if the locking bolt has markings for indicating the locking position.

For reasons of visual improvement and a smooth surface closure, the locking bolt has a countersunk head with a worked profile at its end facing the interior covering.

In order to facilitate or enable the expansion, the snap hook can be preferably slit at least in part.

BRIEF DESCRIPTION OF THE DRAWINGS

The idea on which the invention is based will now be explained in further detail with reference to the embodiments shown in the drawing in which:

FIGS. 2A–C show phases of fixing an interior covering in detailed views;

FIG. 4 shows a plan view of an adapter.

DETAILED DESCRIPTION OF THE INVENTION

Figure 1:
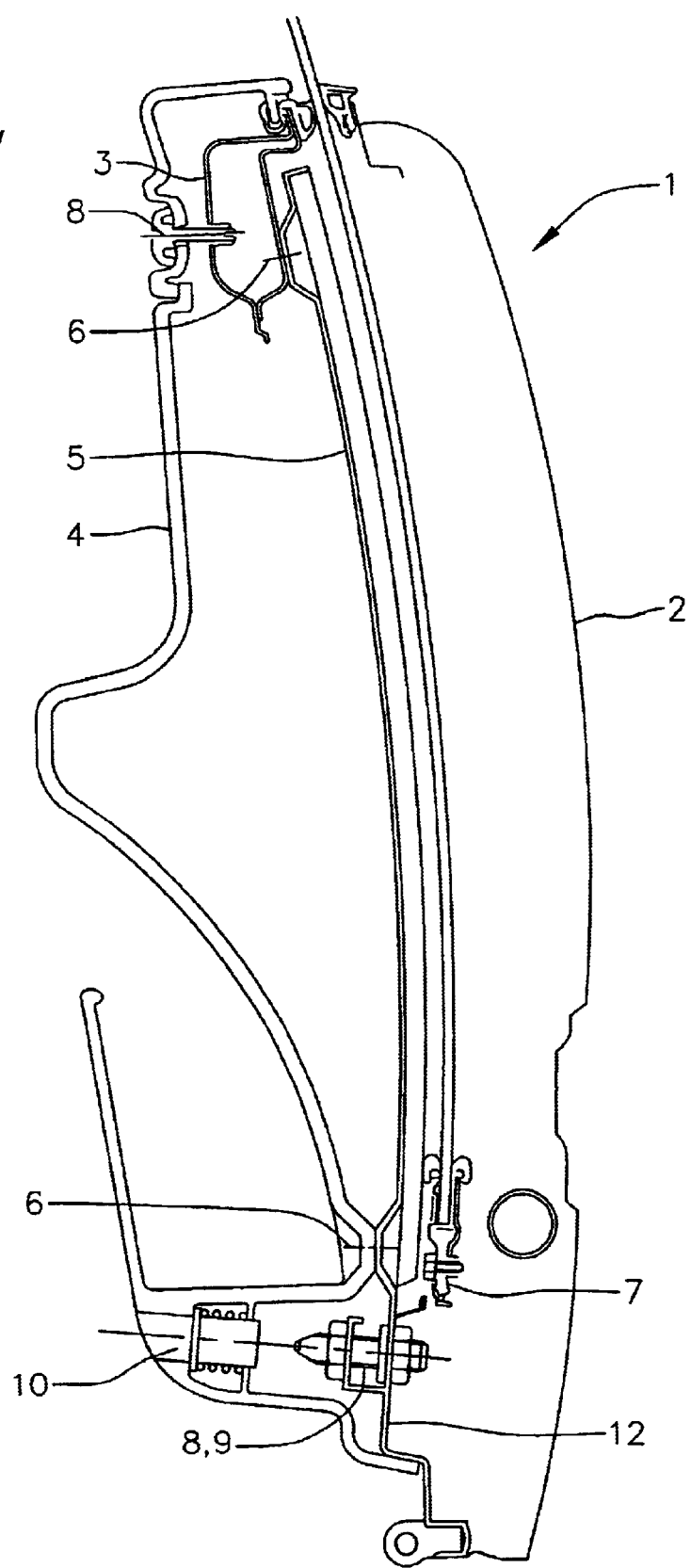
FIG. 1 is a sectional view through a motor vehicle door.

For reasons of clarity, not all of the figures contain all of the reference numerals. However the same reference numerals do characterize the same component parts in the various figures.

FIG. 1 shows a motor vehicle door 1 with a door outside panel 2, an interior covering 4 and a window lifter guide rail 5 fixed thereon. The interior covering 4 and the window lifter guide rail 5 are connected fixedly together through connecting elements 6 such as for example screws or rivets and form one structural unit. A cable guide pulley 7 is fixed on the window lifter guide rail 5. As an alternative to the window lifter guide rail 5 it is possible to fix a sheet metal support plate or another component part on the interior covering 4.

The interior covering 4 is fixedly connected during the final assembly process by fasteners 8 in the upper area of the vehicle door 1 to a shaft reinforcement 3 and in the lower area to the door inside panel 12. In FIG. 1 the state is shown at the end of assembly. The fixing means 8 for the lower area are here designed as a screw bolt 9 which can be operated through an adapter 10.

Figure 2B:
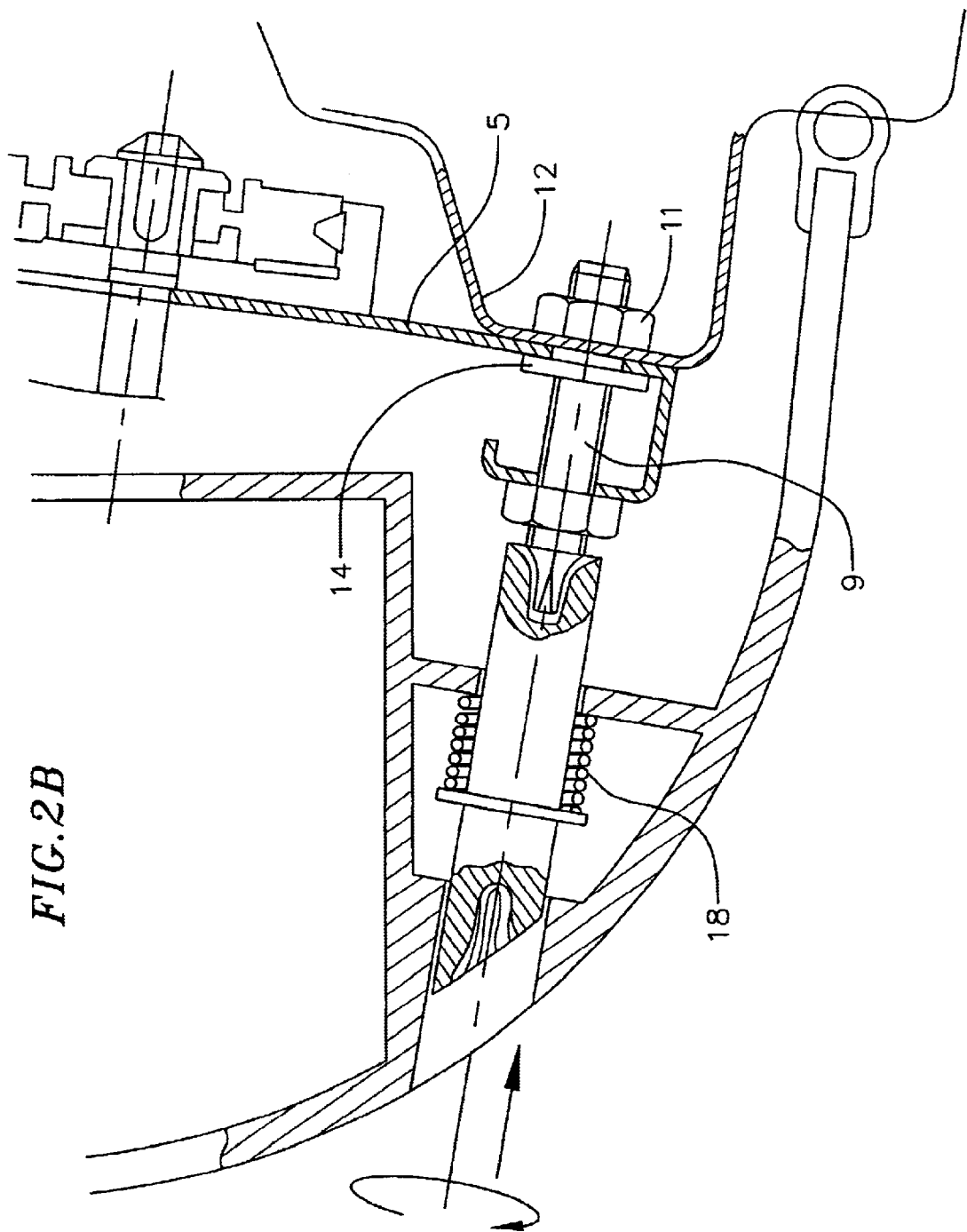
Figure 2C:
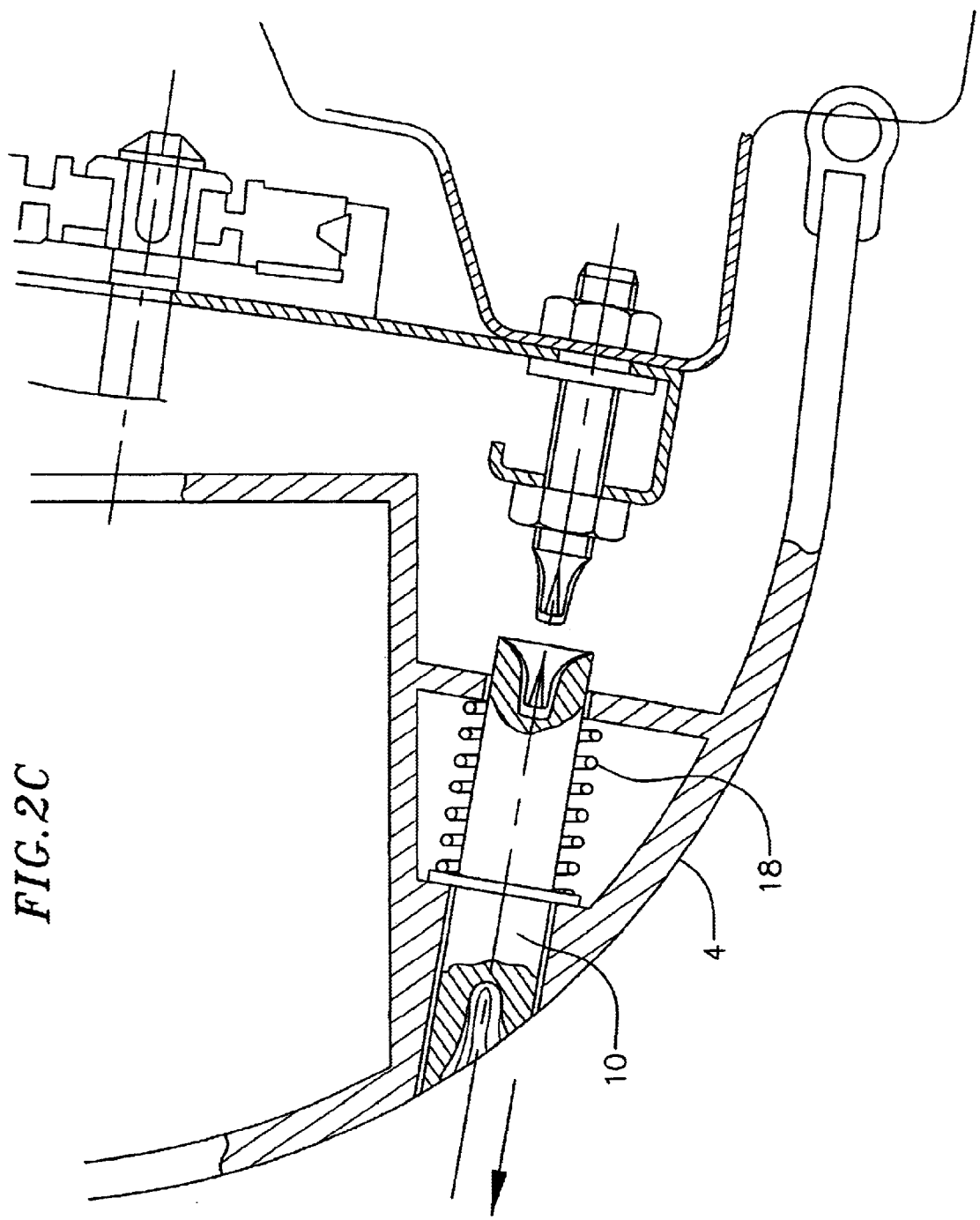

FIGS. 2A–C show in a phase illustration in detailed view how the interior covering 4 is fixed on the door inside panel 12. In FIG. 2A the interior covering 4 is already connected to the shaft reinforcement 3, for example through screwing or a snap-hook, and adjoins in the lower area the door inside panel 12. A thread is formed in the door inside panel 12, in the present case a nut 11 is welded on through a bore so that the interior covering 4 can be screwed to the door inside panel 12 through the fixing means 8 which is aligned correspondingly with the nut 11, and the motor vehicle can be ready assembled.

The window lifter guide rail 5 is bent round U-shaped at its lower end, with a nut 13 likewise being welded on the arm remote from the door inside panel 12 through an access bore. As an alternative a bent metal or plastics strip with a thread fixed or worked thereon can be attached to the window lifter guide rail 5 which represents a functionally identical solution.

During the pre-assembly stage a screw bolt 9, on which a disc 14 is fitted as abutment, is inserted into the nut 13. Attaching the disc 14 can be carried out by welding or by another process during the manufacturing stage of the screw bolt. The threaded section 15 facing the door inside panel 12 preferably does not protrude over the window lifter guide rail 5, or perhaps only slightly. The threaded section 16 facing the interior covering 4 corresponds in length to the threaded section 15 on the side of the window lifter guide rail or is slightly longer.

A force-transferring profile 17 is formed or attached on the threaded section 16 on the covering side at the end of the screw bolt 9. In the illustrated example the screw bolt end is formed as a multi-cog profile. As an alternative basically all the screw head shapes which allow torque to be transferred are possible, of which for manufacturing technical reasons the profiled or head forms are preferred which allow the screw bolt 9 to be screwed in from the window lifter guide rail 5 side, thus where the external dimensions allow passage through the nut 13.

The adapter 10 is integrated in the interior covering 4 rotationally movable and displaceable along the axis A and has a shaped area corresponding to the profile 17 of the screw bolt 9 to engage round the profile 17 or engage in the profile 17. The adapter 10 closes flush with the interior covering 4 and is constantly biased by a compression spring 18 with a force pointing towards the interior of the vehicle to hold the adapter 10 in this position under normal conditions. The adapter 10 is preferably constructed rotationally symmetrical and has a collar 19 which prevents it from sliding out from the interior covering 4 and on which a compression spring 18 is supported.

In the side of the interior a slit or another profile 20 is worked into the adapter 10 through which torques can be transferred to the adapter 10. Internal hexagonal profiles, multi-cog profiles or as shown in FIG. 4 as view X a cross slit profile can be provided here.

In FIG. 2B the screw bolt 9 is already fully screwed into the nut 11, the disc 14 adjoins the window lifter guide rail 5 and fixes the window lifter guide rail 5 and the internal covering 4 against the door inside panel 12 through the clamping forces produced by the screw action. The screw bolt 9 was screwed in by a tool (not shown) by means of which the adapter 10 was turned and moved along the axis A in the direction of the door inside panel 12, as indicated by the arrows. The compression spring 18 was compressed through the axial displacement of the adapter 10 which is required to ensure permanent keyed engagement between the adapter 10 and the screw bolt 9.

At the end of the screwing process and after removing the tool the compression spring 18, as shown in FIG. 2C and indicated by the arrow, again presses the adapter 10 into the starting position and closes the screw opening in the interior covering 4.

Particularly when positioning the adapter 10 against a curved surface of the internal covering 4 the adapter can be brought by rotation out of its proposed end position so that a part projects out from the internal covering 4. In order to achieve a flush closure the adapter 10 must then be aligned accordingly during the assembly process. A slide guide, at least in the end area of the resetting path of the adapter 10 has the effect that no expensive adaption and alignment need take place, but at the end of the screwing operation the adapter 10 need only be turned up to the start of the slide guide and the correct end position will automatically be occupied. A slide guide is particularly favourable if only or mainly an axial displacement of the adapter is undertaken in order to fix the interior covering.

Apart from the combined assembly of the window lifter or support plate and the interior covering 4, it is proposed that the fixing means 8, 9 are integrated directly into the interior covering 4 or that the active connection between the interior covering 4 and the door inside panel 12 can be achieved in another way. This can be produced by separate connecting elements or by other component parts fixed on the interior covering 4.

For dismantling the interior covering 4, the sequence described above is carried out in the reverse order.

Figure 3:
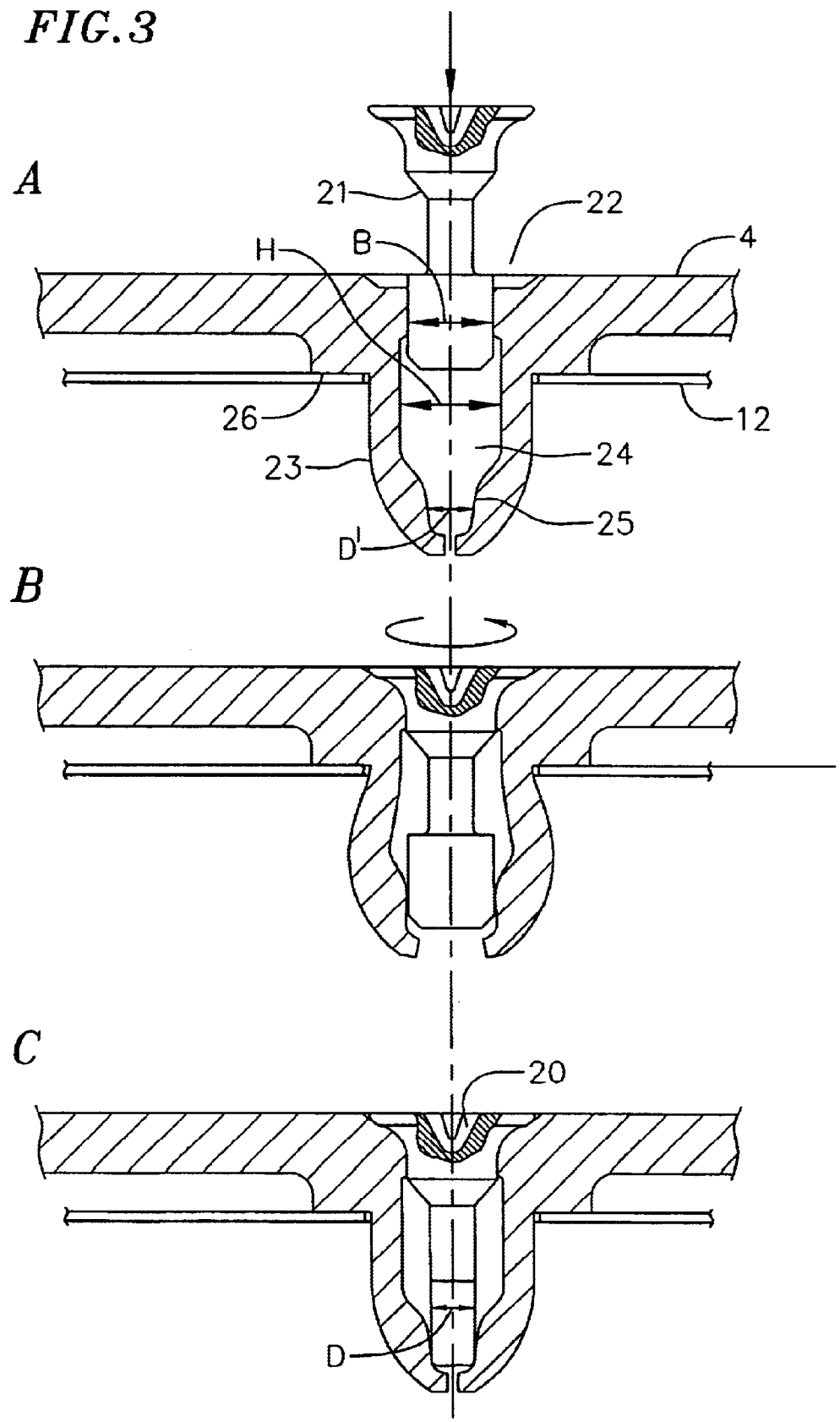
FIGS. 3A–C show phases of fixing by means of a snap-hook.

FIGS. 3A–C show the sequence of fixing the interior covering 4 on the door inside panel 12 by means of a snap-hook 23. A paddle-shaped locking bolt 21 is in FIG. 3A molded on in one piece, for example injection moulded. In the area of the insert opening 22 an ideal break point is provided so that the locking bolt 21 is guided through the insert opening 22 into the snap hook 23 by applying a force in the direction of the arrow, for example through a hammer blow.

The insert opening 22 is adjoined by a hollow cavity 24 which in the present embodiment is shaped cylindrical and corresponds in its diameter H roughly to the greatest width of the paddle-shaped lower end of the locking bolt 21.

As shown in FIG. 3B a locking bolt 21 mounted in this way, once the snap hook 23 is inserted through a bore in the door inside panel 12 up to a stop 26, is inserted further into the tapering hollow cavity 24 so that the snap hook 23 widens out and produces the fixing on the door inside panel 12. In order to enable or facilitate the widening out the snap hook 23 is slit at least in part.

FIG. 3C shows that the lower tapering part 25 of the hollow cavity 24 has a shaped area corresponding to the paddle shape so that by turning the locking bolt 21, as indicated by the arrow in FIG. 3B, the snap hook can be either expanded or brought into its original force. The width D' of the shaped area thereby corresponds to the paddle thickness D or is slightly larger. It is thereby possible by turning about 90° to remove the fastening action and to simply dismantle the interior covering 4. Since, unlike with conventional clips, after turning into a dismantling position there are no longer any more holding forces, dismantling is possible without any effort and the snap hooks 23 cannot break off.

The cross-section of the hollow cavity 24 need not be absolutely circular. Similarly, a design is possible corresponding to the paddle shape wherein the tapering area 25 and longitudinal extension of the shaped area at the lower end of the hollow cavity 24 runs at an angle to the longitudinal extension of the cross-section, preferably at right angles.

Apart from the proposed detent catches in the assembly or locking position, it is possible to provide a two-stage connection by means of snap hooks 23 wherein in a first stage a partial expansion takes place in a position turned 45° to the assembly position of the locking bolt 21 in order to pre-fit a component part on the interior covering 4. Then, by turning round a further 45°, the interior covering 4 is connected to the door inside panel 12 in a procedure analogous with that described above.

For a smooth closure with the interior covering 4, the locking bolt 21 has a countersunk head in which different profiled shapes 20 such as an internal hexagon or cross-slit are worked for engagement with a tool. The locking bolt 21 can thus close flush with the interior covering 4 and can be turned into a locking or dismantling position.

The fixing devices described above are not restricted to interior coverings of motor vehicle doors but can also be used for other vehicle components which preferably connect with the interior of the vehicle.

What is claimed is:

1. A device for fixing an interior covering in vehicles to a bodywork part, comprising:
    an adapter integrated in the interior covering and through which a fixing means can be operated for fixing at least one of the interior covering and a component part fixed on the interior covering to the bodywork part, wherein the adapter is formed rotationally movable and
    wherein the adapter is prevented from sliding out from the interior covering independently of the fixing means.

2. The device according to claim 1, wherein the adapter is integrated axially displaceable in the interior covering.

3. The device according to claim 1, wherein the fixing means are fixed on one of a window lifter and a support plate connected to the interior covering.

4. The device according to claim 1, wherein the adapter closes flush with the interior covering.

5. The device according to claim 1, further comprising a slide guide, wherein the adapter is guided in a slide guide with only an axial displaceability.

6. The device according to claim 1, wherein the fixing means are in active connection with the interior covering.

7. The device according to claim 6, wherein the fixing means are connected directly to the interior covering.

8. The device according to claim 1 further comprising a spring element, wherein the adapter is biased by the spring element against the assembly direction.

9. The device according to claim 8 wherein the spring element comprises an integrated plastics part.

10. The device according to claim 1, wherein the fixing means comprise a screw bolt.

11. The device according to claim 10, further comprising a collar, wherein the collar is attached to the screw bolt.

12. The device according to claim 10, wherein the maximum axial displacement path of the adapter is greater than or equal to the screw-in length of the screw bolt.

13. The device according to claim 1, further comprising:
- a locking bolt as adapter, having a lower end,
- an expanding snap-hook integrated on the interior covering as fixing means, wherein the snap hook has on the inside a hollow cavity in which a socket is formed corresponding to the lower end of the locking bolt, wherein the lower end of the locking bolt has a greater width compared to the thickness.

14. The device according to claim 13, wherein the locking bolt is connected by its lower end to the interior covering through an ideal break point in the area of an insert opening.

15. The device according to claim 13 wherein the lower end of the locking bolt is formed in the shape of a paddle.

16. The device according to claim 13, further comprising a detent catch in the lower end of the hollow cavity.

17. The device according to claim 13, wherein the locking bolt has a countersunk head with a profile.

18. The device according to claim 13, wherein the snap hook is slit.

19. The device according to claim 13 wherein the locking bolt has markings for indicating the locking position.

20. The device according to claims 19, wherein the markings are selected from the group comprising aligned notches and color configurations.

21. A bodywork assembly of a vehicle, comprising:
- an interior covering,
- a bodywork part,
- a fastener,
- a receiver integrated in the bodywork part and adapted to receive the fastener, and
- an adapter integrated in the interior covering and formed rotationally movable, wherein the adapter is formed to operate the fastener to move the fastener relative to the receiver and fix at least one of the interior covering and a component part fixed on the interior covering to the bodywork part and wherein the adapter is prevented from sliding out from the interior covering independently of the fastener.

* * * * *